(12) United States Patent
Villwock

(10) Patent No.: US 10,604,670 B2
(45) Date of Patent: *Mar. 31, 2020

(54) NANOPARTICLES FOR PRINTING MAGNETIZABLE CHARACTERS ON A SUBSTRATE

(71) Applicant: Thomas Villwock, San Diego, CA (US)

(72) Inventor: Thomas Villwock, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/239,351

(22) Filed: Jan. 3, 2019

(65) Prior Publication Data

US 2019/0153253 A1    May 23, 2019

Related U.S. Application Data

(60) Division of application No. 15/176,709, filed on Jun. 8, 2016, now Pat. No. 10,184,057, which is a
(Continued)

(51) Int. Cl.
*C09D 11/38*    (2014.01)
*B42D 25/29*    (2014.01)
(Continued)

(52) U.S. Cl.
CPC .............. *C09D 11/38* (2013.01); *B42D 25/00* (2014.10); *B42D 25/29* (2014.10); *B42D 25/369* (2014.10); *C09D 11/322* (2013.01); *G06K 19/06009* (2013.01); *G06K 19/06196* (2013.01); *H01F 1/0063* (2013.01); *H01F 1/445* (2013.01); *B05D 3/20* (2013.01); *B32B 2255/20* (2013.01); *B32B 2255/26* (2013.01); *B32B 2264/105* (2013.01); *B32B 2307/208* (2013.01); *B32B 2307/41* (2013.01); *B32B 2307/412* (2013.01); *B32B 2307/75* (2013.01); *B42D 2033/16* (2013.01); *B42D 2035/08* (2013.01); *B42D 2035/34* (2013.01); *B82Y 30/00* (2013.01);
(Continued)

(58) Field of Classification Search
CPC ..... C09D 11/38; C09D 11/322; H10F 1/0063; G06K 19/06009; G06K 19/06196; B42D 25/00; B42D 25/369; B42D 25/29
See application file for complete search history.

(56) References Cited

U.S. PATENT DOCUMENTS 3,467,135 A    9/1969    Muskalla
5,026,427 A    6/1991    Mitchell et al.
(Continued)

FOREIGN PATENT DOCUMENTS

WO    2004/003087 A1    1/2004
WO    2004/003088 A1    1/2004
(Continued)

*Primary Examiner* — C Melissa Koslow
(74) *Attorney, Agent, or Firm* — Wagenknecht IP Law Group PC

(57) ABSTRACT

A nanoparticle sized between 10-180 nm composed of $M(III)_2O_3$, $M(II)O$ and $M(II)M(III)_2O_4$, wherein M(III) is a trivalent metal and M(II) is a divalent metal, or $Fe_2O_3$, MnO and M(II)O, wherein M is a divalent metal selected from the group consisting of Fe, Ni, Co, Cu, Pt, Au, Ag, Ba and a rare earth metal.

13 Claims, 4 Drawing Sheets

US 10,604,670 B2
Page 2

Related U.S. Application Data continuation-in-part of application No. 13/410,283, filed on Mar. 1, 2012, now Pat. No. 9,390,846.

(60) Provisional application No. 61/447,874, filed on Mar. 1, 2011.

(51) Int. Cl.

| | | |
|---|---|---|
| *B42D 25/369* | (2014.01) | |
| *C09D 11/322* | (2014.01) | |
| *H01F 1/44* | (2006.01) | |
| *G06K 19/06* | (2006.01) | |
| *B42D 25/00* | (2014.01) | |
| *H01F 1/00* | (2006.01) | |
| *B82Y 30/00* | (2011.01) | |
| *B82Y 40/00* | (2011.01) | |
| *B05D 3/00* | (2006.01) | |

(52) U.S. Cl.
CPC ............ *B82Y 40/00* (2013.01); *H01F 1/0054* (2013.01); *Y10T 428/24802* (2015.01); *Y10T 428/24851* (2015.01)

(56) References Cited

U.S. PATENT DOCUMENTS

| | | |
|---|---|---|
| 5,347,302 A | 9/1994 | Simonoff |
| 5,746,817 A | 5/1998 | Katsen et al. |
| 6,638,982 B2 | 10/2003 | Brown |
| 6,726,759 B2 | 4/2004 | McElligott et al. |
| 6,746,527 B1 | 6/2004 | McElligott et al. |
| 6,767,396 B2 | 7/2004 | McElligott et al. |
| 8,815,393 B2 | 8/2014 | Contadini et al. |
| 9,323,485 B2 | 4/2016 | Villwock |
| 9,390,846 B2 * | 7/2016 | Villwock ............... B82Y 30/00 |
| 9,821,567 B2 | 11/2017 | Villwock |
| 10,184,057 B2 * | 1/2019 | Villwock ............... C09D 11/38 |
| 2001/0013882 A1 | 8/2001 | Niedermeyer et al. |
| 2001/0017641 A1 | 8/2001 | Kobayashi et al. |
| 2001/0024225 A1 | 9/2001 | Ishizawa et al. |
| 2002/0122568 A1 | 9/2002 | Zhao |
| 2004/0080777 A1 | 4/2004 | Smith |
| 2005/0242297 A1 | 11/2005 | Walker |
| 2007/0178295 A1 | 8/2007 | Haas et al. |
| 2007/0285723 A1 | 12/2007 | Fabel et al. |
| 2008/0010215 A1 | 1/2008 | Rackley, III et al. |
| 2009/0087077 A1 | 4/2009 | Nireki |
| 2009/0179974 A1 | 7/2009 | Kimura |
| 2009/0213161 A1 | 8/2009 | Murai |
| 2009/0279143 A1 | 11/2009 | St. Jacques, Jr. et al. |
| 2010/0050901 A1 | 3/2010 | Biris et al. |
| 2016/0198063 A1 | 7/2016 | Villwock |
| 2016/0208120 A1 | 7/2016 | Fonseca De Souza et al. |
| 2016/0280946 A1 | 9/2016 | Villwock |

FOREIGN PATENT DOCUMENTS

| | | |
|---|---|---|
| WO | 2004/086286 A2 | 10/2004 |
| WO | 2017/040423 A1 | 3/2017 |

* cited by examiner

NANOPARTICLES FOR PRINTING MAGNETIZABLE CHARACTERS ON A SUBSTRATE

CROSS REFERENCE TO RELATED APPLICATIONS

This is a divisional of U.S. patent application Ser. No. 15/176,709, now U.S. Pat. No. 10,184,057, filed Jun. 8, 2016, which is a continuation in part of U.S. patent application Ser. No. 13/410,283, now U.S. Pat. No. 9,390,846, filed Mar. 1, 2012, which itself claims priority to U.S. provisional patent application Ser. No. 61/447,874 filed Mar. 1, 2011; each of which is herein incorporated by reference in its entirety.

TECHNICAL FIELD

The invention relates to fluids for ink jet printing characters on a substrate that become magnetized in the presence of a magnetic field and more specifically to a suspension of nanoparticles suitable for high speed and high resolution dot-on-demand inkjet printing, their use for printing magnetizable characters and bio-molecularly code-labeled variations thereof with directly or indirectly detectable IR, visible light and UV fluorescent properties.

BACKGROUND OF THE INVENTION

Inkjet printers are used to reproduce digital images on substrates by delivering variably sized droplets of fluid, such as inks. These fluids generally include a dye or pigment to form the desired color palette together with one or more solvents, whether aqueous or non-aqueous. In addition, they often include additional additives depending on desired properties. Among these include various surfactants, humectants, biocides, and dispersion aids.

Among the recent adaptations of inkjet printing is its use in the production of security documents, such as checks. To this end, fluids have been supplemented with various additives to provide magnetizable properties. Typically, these magnetizable fluids include iron oxide and are printed in special typefaces. The print is read by magnetizing the characters then passing them over a read head, which detects and interprets particular waveforms. This process is referred to as Magnetic Ink Character Recognition (MICR). Among the benefits of MICR is that it permits reliable reading of characters even when overprinted with stamps or other nonmagnetic inks. Thus, MICR provides an encouraging approach for securing documents.

The widespread adoption of MICR has led to increased demand for improved magnetizable fluids; however, there remain significant challenges in their development. Among these include challenges of increasing print speed, resolution and shelf life. For instance, large magnetizable particles tend to retain their imparted charge over longer lengths of time and thus have a longer shelf life compared to smaller particles; however, solutions containing large particles tend to settle, slow printing speeds and decrease resolution. Accordingly, there remains a need to develop new magnetizable fluids for use with inkjet printing that balance increased shelf life with increased print resolution and print speed.

BRIEF SUMMARY OF THE INVENTION

The invention addresses the need to provide magnetic fluids for inkjet applications, which have improved print speed and resolution characteristics while providing long term shelf life. This is accomplished by providing nanoparticle fluids for use with ink jet printing on substrates for magnetic reading. The nanoparticle fluid includes a suspension of nanoparticles including densely packed composites of metal oxides having metals of different oxidation states. Dense packing is achieved through nanosintering the metal oxides under high temperature and pressure, after which they are dispersed in a solvent and adjusted to achieve appropriate viscosity and surface tension for inkjet printing. The nanoparticles are sized between 10 nm to 180 nm and suspended in a solvent to provide a viscosity from 1 to 50 centipoise (cps) and a surface tension of 20-45 dynes/cm. The nanoparticle fluid properties permit dispensing from an inkjet printer at a rate of at least 2.5 m/s and at a resolution of at least 600 dpi; however, a resolution of 2400 dpi has been achieved. The fluids may also include at least one biocide, surfactant or at least one substrate conditioner and optionally a co-solvent, polymeric binder, synergist, colorant, dye, pigment or hybrid thereof. The fluid can include UV curable monomers or oligomers, a photo initiator, a biocide and/or a substrate conditioner. Preferably, the fluids include a shelf life of at least 12 months by resisting separation by a magnetic field or gravitational force. Resisting separation may be concluded if the fluid maintains less than a 30% difference in density at both bottom and top regions of the fluid compared to the average density of the fluid. Preferably, the solvent includes at least 50% by volume an aqueous solvent or a non-aqueous solvent.

The nanoparticles, which themselves also form a related aspect of the invention, include at least two or more metal oxides, which may be the same or different element, but have different valences or oxidation states. Specifically, nanoparticles are formed from metal oxides having metals selected from two of the group consisting of a monovalent metal (Me+), a divalent metal (Me2+), a trivalent metal (Me3+), and a quadrivalent metal (Me4+). The metals can include rare earth metals, including lanthanides, scandium, and yttrium. In some embodiments the metal oxides include a FeIII oxide, a MnII oxide and an oxide of a divalent metal cation including a metal selected from the group consisting of Fe, Ni, Mn, Co, Cu, Pt, Au, Ag, Ba and a rare earth metal. At least one metal oxide may include FeIII or MnII. In a preferred embodiment, the nanoparticle includes $M(III)_2O_3$, $M(II)O$ and $M(II)M(III)_2O_4$, where M(III) is a trivalent metal and M(II) is a divalent metal. In another preferred embodiment the nanoparticle includes $Fe_2O_3$, MnO and M(II)O, wherein M is a divalent metal selected from the group consisting of Fe, Ni, Mn, Co, Cu, Pt, Au, Ag, Ba and a rare earth metal. In some embodiments the distance between any two different neighboring metal oxides within the nanoparticle is 1 nm to 15 nm.

In some embodiments the nanoparticles are further modified to include a second detectable feature, which increases the security of printed documents. In particular, detectable labels can be attached to the nanoparticles through the use of binding surface moieties. In some embodiments, the nanoparticle has a surface moiety embodied as a nucleic acid molecule. In other embodiments, the nanoparticle has a surface moiety embodied as a polypeptide or a protein. In other embodiments, the surface moiety includes phosphates, sulfates, silanes, phosphonic acids, or amines for bonding to a detectable label or to a labeled molecule.

The surface moieties themselves can be bound to both the nanoparticle and a detectable label; or they may be bound to the nanoparticle and to a complementary binding partner, which itself is bound to a detectable label.

In some embodiments, the fluid includes a mixture of different nanoparticles, where a first set of nanoparticles has a blend of differently labeled surface moieties and a second set of nanoparticles has modifiable nanoparticles that can be modified with the same or different labels.

In some embodiments, the fluid further includes C5-12 and C17-24 multi-hydroxy multi-carbonic acids and a co-solvent selected from the group consisting of polyethylene glycol (PEG), glycerine, ethylene glycol, a hydroxyl-(poly) ether, a hydroxyl-(poly) ketone, and a hydroxyl-(poly) aldehyde.

In another related aspect, the invention includes a substrate printed with any of the fluids described. The fluid may be used for inkjet printing, such as using a dot-on-demand process. In some embodiments the fluid is inkjet printed on a paper substrate, which can be porous or non-porous, coated or non-coated. In some embodiments an applied per print pass density of the printed substrate is at least 3.5 mg/inch$^2$. In some embodiments the fluid may be printed on a paper substrate at a print density of 5 μL/inch$^2$ and at a black optical density of at least 90 as measured using the TAPPI METHOD OD 1213.

In some embodiments the substrate is a document printed to include a security feature. In some embodiments the fluid is printed between at least two layers of a multi-layer substrate, optionally wherein surrounding layers are opaque and further conceal the fluid. In some embodiments, the fluid is covered with an opaque covering including a member selected from the group consisting of an ink, a dye, a pigment, a colored fluid, and an overcoat varnish. Detecting indicia printed using the fluid or reading data encoded by the printed indicia can be performed by magnetization and subsequent magnetic scanning to detect the magnetic waveform present and decode the waveform into its corresponding data. Exemplary documents include certificates, currency, checks, tickets and stamps.

In further embodiments, the substrate is printed with a suspension of labeled nanoparticles, where the label emits a detectable signal upon excitation. In a preferred embodiment the label is excited by applying a light source at a particular wavelength or wavelength range to the label, which emits or fluoresces at a longer wavelength that is within the visible spectrum for ordinary optical detection by the user. Further, by incorporating mixtures of different labels, fluorescence of a plurality of distinct colors over a wide spectrum has been achieved. In some embodiments, nanoparticles labeled with different fluorophores are combined into a single suspension to alter the observed color after excitation. In other embodiments, a same nanoparticle is labeled with at least two different fluorophores. In still another embodiment, the nanoparticle suspensions having different labels are stored in different chambers within an inkjet cartridge and inkjet printed in close proximity to yield an observable difference in color after excitation.

In a related aspect a machine readable mark used as a security feature for an object is provided, the mark including the fluid printed on the object and optionally covered by an opaque covering. Exemplary objects include a variety of commercial goods such as electronic devices and their packaging, which includes an inkjet cartridge, a laser printer cartridge, a rotating data carrier, a non-rotating data carrier, a memory chip, a compact disk a DVD jewel and other items that can be inkjet printed. Objects may also include a variety of household items, articles of clothing or other related articles that may be inkjet printed. The machine readable mark may be printed in a configuration such as a 1-dimensional barcode, a 2-dimensional barcode, a PDF417 barcode, a datamatrix barcode, in a E13B format and in a CMC7 format. In some embodiments, the fluid is printed as a readable mark and in multiple vertically stacked 2-dimensional dot arrays separated by thin-film substrates and where each array is selected from the group consisting of an encoded 2-dimensional pattern, a 1-dimensional barcode, a 2-dimensional barcode, a QR barcode, a PDF417 barcode, a datamatrix barcode, a E13B format, a CMC7 format, and a magnetic ink character recognition (MICR) line on a check, ticket, tag and a label.

In another related aspect, use of the fluid in an offset printing method is provided, which includes providing the fluid coupled to a printer, and printing indicia or a pattern on a paper, plastic or other substrate using an offset printing process.

In another related aspect, a method of manufacturing the fluid is provided, which includes: forming at least two different metal oxides from at least two metals having different valences or oxidation states; precipitating the at least two different metal oxides together to form a precipitate mixture; nanosintering the precipitate mixture to form nanoparticles; adding an agglomeration stabilizer and adjusting the surface tension of the magnetic fluid suitable for use with inkjet printing. The method may also include a consolidation step prior to nanosintering. Still further the methods may include adding one or more co-solvents and surfactants or surface active agents after nanosintering and optionally one or more colorants, dyes, pigments or hybrids thereof. In some embodiments the surfaces of the precipitated metal oxides are functionalized before nanosintering by adding one or more surface moieties, and after nanosintering the nanoparticle is labeled with one or more detectable labels, such as fluorophores. In other embodiments, the nanoparticle is functionalized after the nanosintering step and labeled with one or more detectable labels, such as fluorophores. In some embodiments the consolidation step results in a carboxylic acid moiety as the functionalize moiety for adding a detectable label.

DETAILED DESCRIPTION OF THE INVENTION

Figure 1:
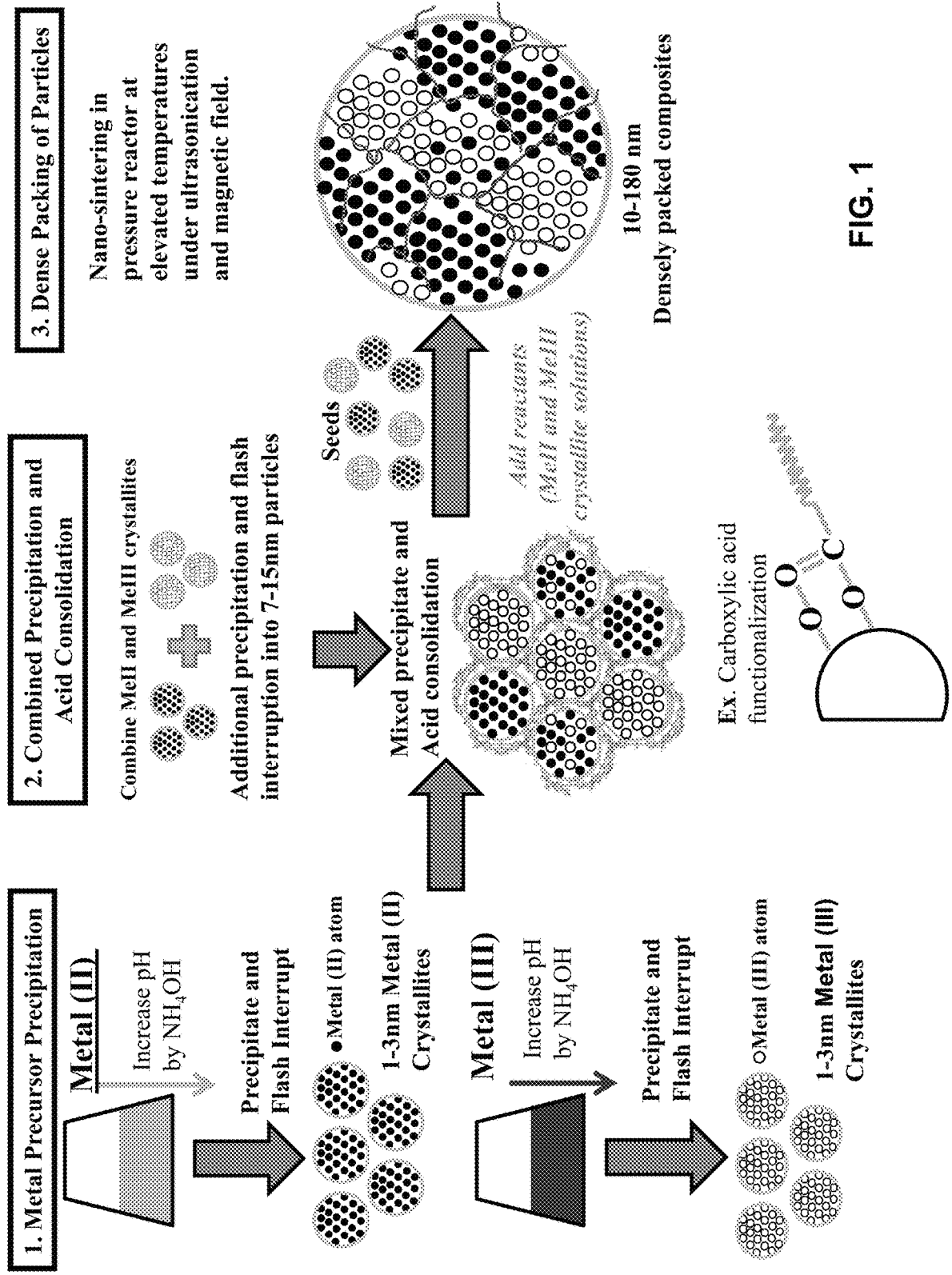
FIG. 1 is a schematic overview of the invention where 1.) Metal oxides are precipitated alone in part, followed by 2.) combined precipitation and acid assisted consolidation and finally 3.) nanosintering of all precipitated solutions to form a densely packed magnetic nanoparticle metal composite.

To assist the reader in understanding the terms used in the description the following provides a brief description of terms commonly referenced.

The term "oxidation number" or "oxidation state" or "valence" as used herein refers to oxidation state as known in the chemical arts, namely, the hypothetical charge that an atom would have if all bonds to the atom of were 100% ionic.

The term "metal element" or "element" as used herein refers to any metal listed on the periodic table. A "metal element" can have more than one oxidation state.

The term "nanoparticle" or "particle" as used herein refers to a distinct complex formed by a plurality of metal oxides sintered together to form an object from 10 nm to 180 nm, where at least two metals differ in oxidation state from one another.

The term "metal oxide" as used herein refers to a crystalline solid that contains a metal cation and an oxide anion. A "metal oxide" encompasses all metal oxides, including any monoxides, dioxides, trioxides, tetroxides, and pentoxides.

The term "rare earth metal" as used herein refers to the group of fifteen lanthanides plus scandium and yttrium found on the periodic table.

The term "per print pass density" as used herein refers to the density of fluid printed on a substrate in a single pass of an inkjet printer from a single nozzle.

As an introduction to the invention, a fluid suitable for printing characters for magnetic recognition having properties which permit high speed and high resolution printing is provided. The fluid is useful in the production of security features for substrates, such as documents or other objects where authentication is desired. The fluid is also useful in the production of indicia used in tracking commercial products or in inventory control. It is an object of the invention to provide a fluid that can be printed at high speeds and at high resolution. It is a further object of the invention to provide a fluid having an extended shelf life. These objects are accomplished through the development of a fluid having a suspension of nanoparticles formed from densely packed metal oxides, where the metals are provided in at least two different oxidation states.

It has been surprisingly found that compared to conventional fluids for magnetic character recognition, the fluids herein have achieved inkjet drop formation on a substrate at speeds of 10 m/sec and higher through small diameter inkjet nozzles of 10 microns or less with shear rates of about 100,000 This permits surprisingly high speed jetting at high resolution of magnetizable particles. This is further surprising in view of the extended shelf life of the fluid, which is greater than 12 months. A variety of parameters have been tested experimentally. It has also been found that compared to current state of the art MICR ink formulations, implementations favor this new invention in terms of uninterrupted duty cycle (e.g. Old vs. New: 10 times improvement), achievable print resolution (e.g. Old: 300<600 vs. New: up to 2400 dpi), drop eject frequency (e.g. Old: 12.5 KHz vs. New: 40 KHz), drop size (e.g. Old: >20 pl vs. New: >2 pl), permissible nozzle diameter (e.g. Old: >50 µM vs. New: >7 µM).

The fluid may be printed using a variety of inkjet printers and may be printed on a variety of substrates depending on the needs of the user. As nonlimiting examples the fluids may be applied using a drop on demand system such as a variety of bubble jet printers, piezoelectric printers and other printing techniques that can use a printing fluid at 1 to 50 cps and a surface tension of 20-45 dynes/cm. As such, the fluid may be stored in any delivery container suitable for use with the desired printer. The invention is particularly useful for printing security features associated with documents, certificates, currency and checks. It is also useful for security features associated with tickets and stamps. Commercially, vendors will use the fluids for security of their commercial products or goods such as by printing the fluid directly on the product or on a substrate associated with the product, such as a product box, sticker, label, tag or other substrate. Exemplary products include electronic devices such as televisions, telephones, stereo components, computers, electronic accessories such as monitors, printers, inkjet cartridges, laser printer cartridges, rotating data carriers, non-rotating data carriers, memory chips, compact disks, DVD jewels, and others. In addition, goods may include clothing or clothing accessories, jewelry or accessories. In some instances, the magnetic fluid is printed on products that require the purchaser to be over a legal age, such as on alcohol containers, tobacco products or other adult products. Since the fluid itself is magnetizable, markings or indicia formed by the fluid discourage tampering such as intentionally altering indicia with fluids that are not magnetizable. Further, the fluid allows vendors or users to write or stamp over the printed indicia without concern of masking the data encoded by the fluid. For instance, a marking or indicia printed with a fluid can be covered by an opaque covering, such as but not limited to an ink or a nonmagnetic substrate.

Preferably, the fluid includes a shelf life of at least 12 months by resisting separation from a magnetic field or gravitational force. In some embodiments the fluid has a shelf life of over 18 months. In some embodiments the fluid has a shelf life of over 24 months. In some embodiments the fluid has a shelf life of three years or more. Shelf life can be determined by calculating a change in density to assess whether the nanoparticles have settled from solution. This can be accomplished by measuring the density of the fluid at top and bottom portions of a stored fluid at any given time point, subtracting the density of the top from the density of the bottom, dividing the result by the average density of the fluid as a whole and multiplying the amount by 100%. As guidance, an exemplary threshold for determining suitable shelf life is a difference in density between top and bottom that is within 30% of the average fluid density; however, a magnetic fluid is more preferred if the value is between 20%-25% and is still more preferred if the value is less than 20%, and is most preferred if the value is less than 10%.

While the fluid can be printed in any desired configuration, configurations of particular interest may include a 1-dimensional barcode, a 2-dimensional barcode, a PDF417 barcode, a datamatrix barcode, a E13B format and a CMC7 format. In other embodiments the fluid is printed as a readable mark and in multiple vertically stacked 2-dimensional dot arrays separated by thin-film substrates and where each array is selected from the group consisting of an encoded 2-dimensional pattern, a 1-dimensional barcode, a 2-dimensional barcode, a QR barcode, a PDF417 barcode, a datamatrix barcode, a E13B format, a CMC7 format, and a magnetic ink character recognition (MICR) line on a check, ticket, tag or label.

In some embodiments the fluid is printed directly on the top of the substrate but other embodiments, the fluid is printed between layers of a substrate. The fluid may also be combined with other security features. For example, when printed together with other security based fluids, such as ultraviolet detectable fluids or printing techniques, such as nonlinear or random printing of data strings, security of a substrate or document can be enhanced. As an example, the fluid can be used in the production of a secured check, where the magnetic properties are positioned in multiple locations and in a nonlinear format and where additional data is printed in a UV excitable fluid.

I. Nanoparticle Fluids

The fluid itself includes a suspension of nanoparticles, which includes metal oxides densely packed by nanosintering under elevated temperature and pressure, then dispersed in a solvent and adjusted to appropriate viscosity and surface tension for printing. After printing, the printed indicia becomes magnetized in the presence of a magnetic field. The metal oxides within the nanoparticle include at least two or more metals having different valences or oxidation states, each of which is selected from a monovalent metal (Me+), a divalent metal (Me2+), a trivalent metal (Me3+), and a quadrivalent metal (Me4+). Rare earth metals may also be used. In some embodiments the metal is a same metal element having a different oxidation state; however, in others at least two metals are both different metal elements and have different oxidation states. In some embodiments three metals having two or three different oxidation states are used, optionally each being a different metal element. In still further embodiments, four metals having two, three, or four different oxidation states are used, optionally each being a different metal element.

The nanoparticle fluid has a viscosity and surface tension that permits dispensing from an inkjet printer at a rate of 2.5 m/s and at a resolution of at least 600 dpi. More preferably the inks are printed at a resolution of 1200 dpi to about 2400 dpi. This is accomplished through the small but dense nanoparticle configuration. In preferred embodiments, the viscosity is 1 to 50 centipoise (cps), the surface tension is 20 to 45 dynes/cm and the nanoparticle is sized from 10 to 180 nm.

The metal oxides provide the printed indicia with its magnetic properties. Exemplary metal oxides that can be used include a FeIII oxide, a MnII oxide and an oxide of a divalent metal cation that itself includes or is derived from a metal selected from the group consisting of Fe, Ni, Mn, Co, Cu, Pt, Au, Ag, Ba and a rare earth metal. Nanosintering results in the joining of the at least two metals having different oxidation states to one another to form nanoparticles suitable for use as in the nanoparticle fluid. Metal oxides are preferably provided in equal or about equal amounts for forming the nanoparticle thereby resulting in an approximately equal ratio of metal oxides within the nanoparticles; however, the skilled artisan will appreciate that their distribution within the nanoparticle may vary. In other embodiments the ratio between metal oxides varies within the nanoparticles. Additional guidance is provided by the following general formula: $Me1(alpha1)a1Me2(alpha2)a2 \ldots Men(alphan)an\text{-}ON$ where $SUM[(alphai)*ai]=2N$, with $alphai$ is element of $\{1,2,3,4\}$, $ai$ is element of $Q>0$ and $Mei$ is element of the group of metals described above and O is Oxygen and N is an integer $>0$. Variations can be achieved by nanosintering different ratios of metal oxide populations. Typically nanosintering results in a segment of about 1 nm to about 15 nm between neighboring metals with different oxidation states; however, in preferred embodiments the average segment between neighboring metals having different oxidation states is from about 1 nm to about 7 nm. By densely packing the particles, increased loads for magnetization may be added during each printing pass along a substrate or document within a given volume. The result is an applied per print pass density of at least 3.5 mg/inch. When testing on a paper substrate the nanoparticle fluid demonstrated a consistent print density of 54 $\mu$L/inch$^2$ and a black optical density of at least 90 as measured using the TAPPI METHOD OD 1213 and a densitometer. A density according to the TAPPI METHOD OD 1213 is the optical-negative logarithm to base 10 of transmittance for transparent material or the reflectance for an opaque material and has the equation Optical Density=log 10 1/R, where R is reflectance. The surface tension of the nanoparticle fluid is generally about 20-45 dynes and the viscosity is generally between about 1 cps to 50 cps for inkjet printing; however, if printed using a different approach, such as an ink pad and press, these values can differ.

The formed nanoparticles may be stored or suspended in a variety of solvents depending on the desired use. For instance, the nanoparticles can be suspended in a solvent including at least 50% by volume of an aqueous solvent or a non-aqueous solvent. The term "solvent" within the context of the invention refers to aqueous or non-aqueous and organic or inorganic solvents. Examples of solvents that may be used with the invention include water, isopropanol, tetrahydrofuran (THF), acetone, hexane, petroleum, epoxy and the like. The solvent may be chosen in part depending on the desired substrate as known in the inkjet arts.

When using the nanoparticle fluids in inkjet processes consideration must be given to the fluid viscosity. A viscosity that is too high tends to the clog the jets or tends to bead on the surface causing an uneven printing. A viscosity that is too low tends to be "runny" when dispensed and reduces the control over the high resolution positioning of colors or images. Accordingly, when using drop-on-demand type printers such as bubble jet printers and piezoelectric printers, the preferred viscosity is less than about 50 centipoise (cps). More preferably the viscosity is between 1-50 cps. The viscosity can be adjusted by thickeners, dispersants other approaches known in the inkjet arts. For example, thickeners tend to increase the viscosity thereby thickening the fluid. Dispersants however promote the distribution and separation of fine or extremely fine solid particles. Accordingly, dispersants may assist in uniformly distributing the magnetic particles throughout the fluid thereby preventing the fluid from settling. Settling can be determined by measuring the density of the magnetic fluid and determining whether or to what extent the density differs from bottom to top in a given magnetic fluid sample. Dispersants are typically provided between about 1% and 10%. Dispersants are generally formed from a surfactant and solvent. Generally the solvent carries the surfactant into the solution and the surfactant reduces the surface tension and prevents agglomeration, such as in response to Van der Waals forces and magnetic forces. Thus, a nanoparticle fluid having a higher capacity to impart a magnetic force may require more surfactant than a conventional inkjet fluid. Surfactants themselves are well known in the inkjet arts. While amounts can vary, surfactants are generally provided in an amount from about 0.1% to about 8%. Greater amounts of surfactants tend to reduce surface tension and thus increase wetting. The particular amount of surfactant may vary depending on the particular nanoparticles or the substrate used for printing.

In addition, a variety of additives may be provided, including but not limited to one or more biocides, humectants or drying control additives, synergists, substrate conditioners or wetting additives, colorants or surface appearance additives, pigments, other metallic or nonmetallic nanoparticles, dyes, polymer additives, anti-settling additives, dispersants, foam control, adhesion promotion additives, rheology control additives and the like as known in the inkjet arts. In some embodiments ultra violet curable monomers or oligomers and initiators are provided in the magnetic fluid, which upon exposure to a UV light source forms a solid polymer.

Biocides and fungicides are chemical substances or compounds capable of killing living organisms. As such, their inclusion may prevent growth or attachment of living organisms to the fluid thereby increasing its lifespan. Biocides and fungicides may be synthetic or natural and may themselves have short or long half-lives. A variety of biocides and fungicides are known in the inkjet arts and thus their inclusion and relative amounts may be determined by the ordinarily skilled artisan. While amounts can vary, generally biocides and fungicides form about 0.01% to about 1% of the fluid. In some embodiments biocides also provide surfactant or humectant properties.

Humectants are compounds that reduce evaporation and are often provided as a co-solvent together with a dispersant. Accordingly, humectants assist in retaining a consistent concentration of particles throughout the shelf life of the fluid. An exemplary humectant is ethylene glycol. Examples of preferred co-solvents include ethylene glycol, polyethylene glycol (PEG), glycerine, hydroxyl-(poly) ether, hydroxyl-(poly) ketone, a hydroxyl-(poly) aldehyde and others known in the inkjet arts. As a nonlimiting example, humectants are usually provided between 0% and less than 1%; however, greater amounts such as about 5%, 10%, 15% and 20% are also encompassed by the invention.

The nanoparticle fluid may also include UV curable monomers or oligomers, a photo initiator, and a substrate conditioner depending on the intended end use. Accordingly, UV curable monomers or oligomers may undergo a polymerization reaction to polymerize the fluid composition along the substrate, which decrease drying time. A variety of polymers are known in the art such as acrylates, including methacrylates, hydroxyethyl methacrylate, and others. Further, hydrophobic polymers are polymers that do not absorb an appreciable amount of an aqueous solution; whereas hydrophilic polymers do tend to absorb an appreciable amount of aqueous solution. UV curing is generally accomplished by applying a UV source to a photo initiator, which begins the polymerization reaction. In an exemplary method of use, the magnetic fluid including UV curable monomers or oligomers are applied to a substrate, such as using an inkjet printer. The nanoparticle fluid is cured by applying a UV source to initiate radical formation and thus polymerization. UV light sources can be coupled directly to an ink jet printer or may be provided separately. In another approach the nanoparticle fluid incorporates oxidative polymerization to assist in drying of the fluid. In oxidative polymerization oxygen from the air adds to double bonds within the fluid to form hydroperoxides. Like UV induced polymerization, the resulting free radicals attack other molecules and form new larger free radicals. This causes polymerization of the fluid. Whether a UV curable approach is used or oxidative polymerization or cationic polymerization, adding monomers or oligomers that can undergo polymerization to the magnetic fluid can reduce drying time of the magnetic fluid.

Colorants may also be added to change or enhance the coloring of the nanoparticle fluid. One skilled in the art will appreciate that a variety of approaches are used to impart color, which include the use of colorants, dyes, pigments, and hybrids thereof. Accordingly, the term "colorant" as used herein can also refer to dyes, pigments, and hybrids thereof as used in the inkjet arts. Dyes are generally applied in an aqueous fluid and typically have an affinity for the substrate; whereas, pigments are generally insoluble and do not have affinity for the substrate. While dyes may be used, generally pigments are preferred. Each can be used as desired by the user and as consistent with the particular formulation. Colorants are generally provided in an amount of about 1% to 15% although they may be used in higher amounts such as 20%, 25%. 30% or more.

A sample of a typical water-based inkjet fluid that can be used with the nanoparticles is shown in Table 1 below:

TABLE 1

| Component | Composition | Purpose |
| --- | --- | --- |
| Water | 50-90% | Solvent, carrier fluid |
| Colorants -Dyes and Pigments | 0-10% | Add vibrancy |
| Co-solvents | 5-50% | Humectants, enhance ink formation on paper |
| Surfactants | 0-5% | Improve wetting and flow through nozzle |
| Polymeric binders | 0-10% | Increase durability and appearance of print |
| Other additives: biocides | 0-1% | Prevent bacteria growth |

Printing indicia with a nanoparticle suspension lacking added colorant provides a colorless and transparent print, which provides added security for authenticating documents by not immediately revealing the position of the magnetizable indicia. However, further variations have been made to the nanoparticle to provide still further security features. For example, in some embodiments the nanoparticle is labeled with a molecule, such as a fluorophore that emits a wavelength in the visible spectrum in response to exposure to a shorter excitation wavelength. In this embodiment, printed indicia provides both magnetism and fluorescence for document authentication. In further embodiments, a collection of nanoparticles are labeled with different fluorophores and deposited together on a substrate so they emit blended colors upon excitation. By blending colors or using print with different fluorescent colors, the secured document can have a color profile for authentication. Such nanoparticle suspensions can be adapted to conventional inkjet cartridges akin to the conventional colors red, yellow and cyan, by providing red, yellow and cyan fluorescence and/or other fluorescent colors.

Most fluorophores are organic small molecules of 200-1000 Da, with some, such as Green fluorescent protein (GFP) and phycobiliporteins (PE, APC) being about 27 kDa and 240 kDa respectively. Depending on the print method, nonlimiting examples of fluorescent polypeptides or proteins that may be usable with the nanoparticle suspension include blue fluorescent protein (BFP), cyan fluorescent protein (CFP), green fluorescent protein (GFP), enhanced green fluorescent protein (EGFP), red fluorescent protein (RFP or R-PE or PE-Cy5), yellow fluorescent protein (YFP), and others known in the art to which these belong.

In other embodiments, the fluorophore is a compound but not a protein or a polypeptide. Non-protein based fluorophores typically have several combined aromatic rings or are themselves cyclic. As nonlimiting examples, the fluorophore may be selected from xanthene derivatives (e.g. fluorescein, rhodamine), cyanine derivatives (e.g. cyanine, indocabocyanine), squaranine derivatives, naphthalene derivatives, coumarin, derivatives, oxadiazole derivatives, anthracene derivatives, pyrene derivatives, oxazine derivatives, acridine derivatives, arylmethine derivatives and tetrapyrrole derivatives.

Fluorescent molecules can be conjugated to the nanoparticle by functionalizing the surface of the nanoparticle then reacting the fluorophore with the functionalize surface. For instance, a surface functionalized with amines can be made to bond to a fluorophore via an amide bond. In another approach, a surface functionalized with carboxylic acid moieties is reacted with an N-terminus of a polypeptide. Ester chemistries may also be used to bind labels to nanoparticles. In another approach a surface functionalized with single stranded oligonucleotides can be reacted with a fluorophore conjugated to a complementary nucleic acid strand. In still another approach the nanoparticle is biotinylated then reacted with a fluorophore conjugated to an avidin (e.g. avidin, streptavidin, ultra avidin) or vice versa. In still another embodiment a surface protein is immobilized on the surface of the nanoparticle, and a labeled antibody fragment against the surface protein is added to label the nanoparticle. To this end, the nanoparticle may have a surface moiety that is a nucleic acid molecule, a polypeptide, a protein or a molecule having a complementary binding partner. The nanoparticle may itself have a surface moiety with a detectable label.

In some embodiments, the fluid includes a mixture of different nanoparticles, where a first set of nanoparticles has a blend of differently labeled surface moieties or fluorescent labels and a second set of nanoparticles has modifiable nanoparticles that can be modified with different labels, such as by adding desired labels. To this end, mixtures of different labels can be applied to a substrate having a unique fluorescent profile.

Functionalizing the surface for subsequent label attachment can be performed before or after nanoparticle formation. Functional groups such as nucleic acids, carboxylic acids, phosphates, sulfates, silanes, phosphonic acids, amines, etc. are suitable as moieties for adding detectable labels. Functionalization methods themselves may include microemulsions, redox transmetalization, sol gel methods, and so on to create core with shell. Au, Ag, Pt, Pd, $SiO_2$, and C are common shell materials for magnetic nanoparticles to introduce additional surface functionality.

In a preferred approach, functionalization includes exposing single stranded nucleic acids, whether DNA, RNA or cDNA to the nanoparticle for absorption. Alternatively, partially double stranded nucleic acid molecules can be absorbed, then one stranded melted from the other to produce a free single strand. Melting temperature of nucleic acid strands depends generally on the length of the nucleic acid molecule (longer oligos have higher melting temperatures than shorter oligos) and guanine-cytosine (GC) content compared to the adenine-thymine (AT) content (GC having a higher melting temperature because GC has three nucleotide bonds whereas AT has two). Still further, mismatching base pairs can lower the melting temperature.

Once absorbed single stranded nucleic acid molecules can accept a complementary nucleic acid strand that itself is labeled for binding. In such an approach, labels that emit different colors in response to exposure to a frequency spectrum can be combined to produce signature excitation profiles. That is, by functionalizing the surface of the nanoparticle with mixtures of different oligonucleotide sequences, different complementary oligonucleotides can be selectively added to the nanoparticle to selectively label the nanoparticle with different labeling molecules. Joining different labels can be arranged according to annealing temperature of the complementary nucleic acid strands.

II. Uses for Nanoparticle Fluids

While the nanoparticle fluid can be used for printing on nearly any substrate, the invention is particularly useful for printing security features associated with documents, certificates, currency, checks, commercial products and other substrates with security features. In some embodiments, the nanoparticle fluid is used as a means for magnetic ink character recognition, such for printing MICR lines on checks. In such embodiments the nanoparticle fluid is printed on a check such that when the check moves across a magnetic head the magnetic head detects the flux of magnetic signal and when combined with the elapsed read time, obtains a characteristic curve in accordance with the change in magnetic flux. While the MICR approach in general is known in the art; the nanoparticle fluid of the present invention has a higher capacity to retain magnetic forces yet provides smaller magnetizable particles, which facilitates improved resolution, a higher signal to area ratio, higher speed printing and higher speed of recognition. Still further, while conventional MICR lines are printed along the bottom of the check and in linear format, the nanoparticle fluid may be printed in other locations and in other configurations. For example the nanoparticle suspension can be printed to enhance security by printing in various font sizes, in a non-linear configuration, a curved configuration, an angled configuration or in randomized places on the document. In addition, conventional MICR lines and associated printing inks have always been colored. In contrast, the nanoparticle suspension and its printed indicia is transparent and colorless unless a colorant is added. That is, the nanoparticle suspension cannot be seen by the naked eye unless provided in an embodiment with an added visible colorant. To this end, indicia printed with the nanoparticle suspension is typically invisible without further aid thereby improving its security.

In some embodiments the fluid is printed directly on a commercial product such as directly on a device itself or its packaging. Thus, uses of the nanoparticle fluid expand beyond banking uses and extend into product security, inventory control and the like through the incorporation of the nanoparticle fluid together with a magnetic reader.

While the nanoparticle fluid may be used alone, in other embodiments the nanoparticle fluid is used together with a second fluid, such as nomagnetizable ink, which in some instances is applied over the nanoparticle fluid to hide or visually mask magnetic features or to impart color to indicia printed in nanoparticle fluid to enhance its visibility or identification. Accordingly, in a related aspect of the invention, a substrate having the nanoparticle fluid printed thereon is provided, which optionally also includes a second fluid such as a colored non-magnetizable fluid also printed thereon. In other embodiments the nanoparticle fluid is provided together with additional security fluids, such as UV excitable fluids that are exposed by the application of a UV source, IR excitable fluids that are exposed by the application of a IR source, colored fluids in non-linear formats, such as random non-linear printing of security data and the like.

The nanoparticle fluids can be printed using an inkjet printer. One skilled in the art will appreciate that the nanoparticle fluid can be provided in a suitable housing, such as a print cartridge as dictated by the printer. Similarly, one skilled in the art will appreciate that the nanoparticle fluid can be printed in a variety of formats or configurations through the use of suitable print software. For example, nanoparticle fluid can be used to print a mark such as a 1-dimensional barcode, a 2-dimensional barcode, a PDF417 barcode, a datamatrix barcode, indicia in E13B format, CMC7 format or the like. In some embodiments the fluid is printed as a readable mark and in multiple vertically stacked 2-dimensional dot arrays separated by thin-film substrates and where each array is selected from the group consisting of an encoded 2-dimensional pattern, a 1-dimensional barcode, a 2-dimensional barcode, a QR barcode, a PDF417 barcode, a datamatrix barcode, a E13B format, a CMC7 format, and a magnetic ink character recognition (MICR) line on a check, ticket, tag or label.

In some embodiments, the user generates an image using suitable image drawing software and prints the image on a substrate using the nanoparticle suspension or fluid. Such technologies generally involve generating one or more bitmaps. For example, in some approaches a bitmap is generated for printing magnetizable characters using the nanoparticle fluid and a second bitmap is generated for printing a non-magnetizable characters. Examples of non-magnetizable fluids include a variety of fluids generally referred to as inks that include colorants, pigments, dyes or a mixture thereof to provide visible indicia. Although the skilled artisan will appreciate that the nanoparticle suspension itself may also include one or more colorant, pigment, dye or mixture thereof. In any event, one skilled in the art will recognize that printing the nanoparticle fluid on a substrate results in a magnetically readable mark, which can be detected by a suitable magnetic reader. Generally such magnetic readers are coupled to a computer to interpret the magnetically encoded data such as converting magnetic waveforms into corresponding data.

While the nanoparticle fluid can be printed directly on a substrate or on top of a layered substrate, in some embodiments the nanoparticle fluid is layered between at least two layers of a substrate since the magnetic properties in some embodiments are detectable through the substrate. In further embodiments, the substrate includes three or more layers with the nanoparticle fluid printed between two or more of the layers. While the substrate can be transparent or semi-transparent often the substrate will be opaque. In some instances the substrate is a multi-layer laminate. In such instances, inkjet printing using the nanoparticle fluid can be performed during the lamination process. Accordingly, markings may be printed between layers, which associate the particular laminate with its corresponding characteristics, identification, authentication or other usable data as needed by the user. While useful for securing documents, the nanoparticle fluid or a fluid containing the densely packed nanoparticles may also be adapted for biomedical applications. For example, densely packed nanoparticles that are biocompatible and non-toxic may be used in vivo as contrast agents in magnetic resonance imaging (MRI), labeling of tissues or cells, such as cancerous tissues, magnetic control of transport of therapeutics, thermotherapy and the like. The nanoparticle fluid may also be used ex vivo or in vitro to detect or measure interactions between molecules, such as through coupling the densely packed nanoparticles to compounds, polypeptides and the like followed by assays such as binding assays known in the chemical and biochemical arts.

Nanoparticle fluids suitable for use in MRI include the densely packed nanoparticles formed from metals provided in two different oxidation states that are suspended in a suitable solvent or media. The skilled artisan will appreciate that depending on the intended use or route of administration, the formulation may deviate from the formulations used in ink jet printing. For example, MRI contrasting agents would not generally incorporate colorants, dyes or inkjet solvents and may be provided at a biological pH, use biocompatible solvents and delivery vehicles known in the MRI field. When coupling the densely packed nanoparticle to compounds, such as to antibodies for targeting a particular protein or cell type, such as a cancer cell in a heat treatment, the particle can be adapted with reactive groups that facilitate protein or nucleic acid conjugation.

III. Methods of Manufacturing Nanoparticle Fluids

In a related aspect of the invention, a method of manufacturing a nanoparticle fluid is provided. The method includes i. providing at least two metals having different valences or oxidation states as three samples, wherein a first sample includes the first metal, a second sample includes the second metal and a third sample includes both the first and second metal, such as an consolidated alloy; ii. forming metal hydroxides from the metals in each of the samples; iii. combining the three samples to form a mixture of different metal hydroxides; iv. nanosintering the mixture of metal hydroxides to form densely packed composite nanoparticles; and v. coating nanoparticles with low molecular weight hydroxyl carbonic acids to act as agglomeration stabilizers.

In preferred embodiments, metals used in the manufacturing of the nanoparticle fluid have different valences or different oxidation states. Most preferably, the two or three metals are selected from two of the group consisting of a monovalent metal (Me+), a divalent metal (Me2+), a trivalent metal (Me3+), and a quadrivalent metal (Me4+). The metals can be rare earth metals. Rare earth metals are generally in a 3+ oxidation state; however, europium also has a valence of 2+ and cerium also has a valence of 4+. Nonetheless, at least one and up to four metals having two different valences or oxidation states are selected, which may be from different metal elements having different oxidation states or same metal elements having different oxidation states. Metals are generally added to an aqueous solvent in the form of a salt (chlorides, sulfates, nitrates, etc.), to begin the transformation into cross-crystallized nanoparticles. Possible metal combinations and general stoichiometric formulations for cross-crystallized magnetic nanoparticles are as follows:

a.) $Fe(III), Fe(II), Mn(II) \rightarrow Fe(III)_2Fe(II)_{0.5}Mn_{0.5}O_4$ b.) $Fe(III), Fe(II), Co(II) \rightarrow Fe(III)_2Fe(II)_{0.3}Co_{0.7}O_4$ c.) $Ni(II), Fe(III), Co(II) \rightarrow Fe_2Ni_{0.3}Co_{0.7}O_4$ d.) $Ni(II), Fe(III), Mn(II) \rightarrow Fe_2Ni_{0.3}Mn_{0.7}O_4$ e.) General:

$$(Me(III)_2Me(II)_{1-b}Me(II)_b)O_4$$

$$(Me(I)Me(II)_{1-b}(MeIII)_{1-(2/3b)}(MeIV)_2O_5$$

Initially, metals can be precipitated into metal hydroxide precipitates by hydroxide displacement of a corresponding acidic inorganic anion of the metal salt, which is later followed by rapid dehydration to form a metal (Me) oxide. In the preferred embodiments at least three metal hydroxide solutions are precipitated including at least two individual metal hydroxides and one combined metal hydroxide solution (i.e. $Fe_2O_3$, MnO, and $Fe_2MnO_4$). The first precipitation of the at least two individual metal hydroxides results in 1-3 nm metal crystallites which are combined and precipitated again to form the third hydroxide solution with 7-15 nm particles. In preferred embodiments precipitation is interrupted by flash freezing with a cryogenic fluid once the precipitation reaction results in particles of about 7-15 nm. Determining or confirming particle size can be conducted using a variety of methods, such as various filtration techniques to exclude particles that are too large, milling to ensure the particles are not too large or other approaches known in the inkjet arts. Preferably milling is avoided. A series of centrifugation steps can also be used to separate different sized particles. Characterization techniques such as transmission electron microscopy (TEM) or high resolution scanning electron microscopy (SEM) can also provide images to determine size. Zetasizers or other particle size analyzers can also be utilized for achieving particle size distributions, etc. After the precipitation interruption at the desired size, the three solution samples (two individual metal hydroxide solutions (1-3 nm crystallites) and a collective metal hydroxide solution (7-15 nm particles) can be combined by acid consolidation to form a compiled mixture of precipitated metal hydroxides for downstream additional precipitation reactions and eventually nanosintering. In the preferred embodiments, the optional step of acid consolidation is based on acid surface active agents which assist in providing a short-range force on the particles for bringing them closer to one another. Ultimately, the acid consolidation aids in densification of the particles.

A final mixture of precipitated metal oxides is then nanosintered to form an ultimate nanoparticle (10-180 nm) of both metals. In the preferred embodiments, nanosintering is initiated by ejecting at least three precipitated fluids simultaneously towards a heating rod heated to 40-90 degrees C. The fluid is collected in a chamber where the nanoparticles undergo a low pressure (<100 MPa) sintering stage with temperatures between 80-120 degree C. It should be noted that higher pressures (up to 1 GPa) can also be used achieving the desired nanosintered atomic structure. Ultrasound frequencies around 60 kW/m3 together with an induced magnetic field (created by permanent magnets near the reaction chamber) assist in densification during the nanosintering process. Preferably, nanosintering results in highly dense nanoparticles such that magenetizable properties of printed indicia may be prolonged thereby increasing its shelf life while also increasing the magnetic capacity of the particles. In preferred embodiments the distance between neighboring metals that have different oxidation states, which is also referred to as the intra particle segment is about 1 nm to about 15 nm and preferably an overall particle size is about 10-180 nm. Achieving unexpectedly dense particles of such small size is achieved by the precipitation and sintering approach. Specifically, sintering can be enhanced by altering the pH of the solution in a range between 10-14, increasing the temperature of the solution to over 40° C., more preferably to about 120° C., applying ultrasound at a frequency above 20 KHz (greater than 60 $KW/m^3$), and reducing the spatial distribution of the precipitate by applying a magnetic field of 0.1-1T, preferably 0.5T to the particles during the sintering process. In some cases, the magnetic field is realized by placing two permanent magnets of 40 kGauss at the bottom and 10 kGauss at the top of the reaction chamber. The magnetic field affects the nanoparticles and influences the transport through the media during the nanosintering process. Any such method to polarize the electron clouds and create electron shells in the media could be utilized during nanosintering to influence the nanoparticles. Furthermore, nanosintering is a result of anisotropic advanced crystal growth under confined conditions.

FIG. 1 reveals a schematic overview of the invention where 1.) Metal precursors produce metal crystallites 1-3 nm in diameter 2.) Combined precipitation and acid consolidation of the two metals creates 7-15 nm particles consisting of a combination of two metals and 3.) nanosintering occurs when additional metal crystallite seeds are added to the consolidated metal precipitated mixtures under discrete temperatures, pressure, ultrasound frequency, and magnetic fields to produce nanoparticle metal composites 10-180 nm in size.

Once nanosintered, preferably the nanoparticles have a size or diameter of about 10-180 nm but more preferably 10-60 nm. While the methods themselves produce a high purity of such nanoparticles, filtration of the densely packed nanoparticles can confirm and optionally select for the desired size. In preferred embodiments, in the process of consolidating nanoparticles prior to nanosintering of the nanoparticles as well as afterward, it is beneficial to stabilize the particles by applying active surface agents (surfactants, ligands, small polar molecules, polymers), preferably acid surface agents such as carbon-based molecules rich in carbonic acids and/or hydroxyl moieties. Among these include C5-12 and C17-C24 multi-hydroxy multi carbonic acids. Preferably, for aqueous citrate ion ligands (1-100 mg/ml) provide electrostatic repulsion for stabilization and for non-aqueous fatty acids such as oleic acid (0.1-100 mM) provide steric repulsion for stabilization. In some cases the combination of electrostatic and steric stabilization is found, for example in the case of some polymers or dendrimers. In other cases the addition of multiple layers of surface agents may be required. In general, surface active reagents can be chemically anchored or physically adsorbed on the densely packed nanoparticles to form a repulsive force to balance the van der Waals attractive forces acting on the nanoparticles, thus stabilization in a suspension is achieved. Functional groups including but not limited to nucleic acids, carboxylic acids, phosphates, sulfates, silanes, phosphonic acids, amines, etc. are suitable as surface active functionalities. Those skilled in the art of nanoparticle synthesis will appreciate that precious metals and other coatings can be deposited on densely packed nanoparticles through reactions in microemulsions, redox transmetalization, sol gel methods, and so on to create core—shell magnetic nanoparticles if desired post sintering. Au, Ag, Pt, Pd, $SiO_2$, and C are common shell materials for magnetic nanoparticles to introduce additional surface functionality.

Functionalizing the surface of the nanoparticle with a surface moiety can improve the security of the documents printed with the nanoparticle suspension. By functionalizing the surface, the nanoparticle can be labeled with molecules detectable by means other than magnetization, which provides at least two forms of identification for authentication. In some embodiments, the carboxylic acid group is joined to an amino terminus of a polypeptide or a protein, which itself is detectable. In another embodiment the polypeptide or protein is conjugated to the functionalized surface of the nanoparticle using a different conjugation chemistry. In some embodiments, amide linkages bind the polypeptide to the nanoparticle.

Nonlimiting examples of polypeptides or proteins that may be usable with the nanoparticle include blue fluorescent protein (BFP), cyan fluorescent protein (CFP), green fluorescent protein (GFP), enhanced green fluorescent protein (EGFP), red fluorescent protein (RFP or R-PE or PE-Cy5), yellow fluorescent protein (YFP), and others known in the art to which these belong.

In another embodiment, the label is a fluorescent molecule that is not a protein or amino acid. These typically have several combined aromatic rings or are cyclic. As nonlimiting examples, the molecules may be selected from xanthene derivatives (e.g. fluorescein, rhodamine), cyanine derivatives (e.g. cyanine, indocabocyanine), squaranine derivatives, naphthalene derivatives, coumarin, derivatives, oxadiazole derivatives, anthracene derivatives, pyrene derivatives, oxazine derivatives, acridine derivatives, arylmethine derivatives and tetrapyrrole derivatives.

An alternative and/or additional approach to functionalization includes exposing single stranded nucleic acids, whether DNA, RNA or cDNA to the nanoparticle for absorption. This can be performed at room temperature for about 30 minutes. Alternatively, partially double stranded nucleic acid molecules can be absorbed, then one stranded melted from the other to produce a free single strand for binding. Melting temperature of nucleic acid strands depends generally on the length of the nucleic acid molecule (longer oligos have higher melting temperatures than shorter oligos) and guanine-cytosine (GC) content compared to the adenine-thymine (AT) content (GC having a higher melting temperature because GC has three nucleotide bonds whereas AT has two). Still further, mismatching base pairs can lower the melting temperature.

Once absorbed nucleic acid strands can accept a complementary nucleic acid strand that itself is labeled for binding. For instance, it is well known that guanine (G) bonds cytosine (C) and adenine (A) bonds to thymine (T). In such an approach, labels that emit different colors in response to exposure to a frequency spectrum can be combined to produce signature excitation profiles. That is, by functionalizing the surface of the nanoparticle with mixtures of different oligonucleotide sequences, different complementary oligonucleotides with different labels can be selectively added to the nanoparticle to selectively label the nanoparticle with different label molecules. It has also been found that the addition of a co-solvent can improve the properties of the magnetic fluid when using it in the application of inkjet printing. Preferably, the co-solvent includes polyethylene glycol (PEG), glycerine, ethylene glycol, a hydroxyl-(poly) ether, a hydroxyl-(poly) ketone, a hydroxyl-(poly) aldehyde or the like.

Adapting the nanoparticle fluid for a variety of different purposes, print nozzles or for variations that improve shelf life may also include the addition of UV curable monomers or oligomers, a photoinitiator, a biocide, a bonding agent, an anti-corrosion agent, a substrate conditioner, buffer reagents to control pH or the like as known in the inkjet arts. Additives may also be provided to enhance or alter the color of the magnetic fluid. Among these include a variety of colorants, pigments, dyes or a mixture thereof.

Example 1

Formation of Densely Packed Nanoparticles for Use in a Magnetizable Fluid

In this example, i.) metal oxides of Me(III) and Me(II) are precipitated alone in part, followed by ii.) combined precipitation. The combined precipitates then undergo iii.) acid assisted consolidation followed by iv.) nanosintering. Afterwards, colorants and additives can be provided to the nanosintered oxide structures as desired to create a final nanoparticle fluid for desired applications.

Figure 2:
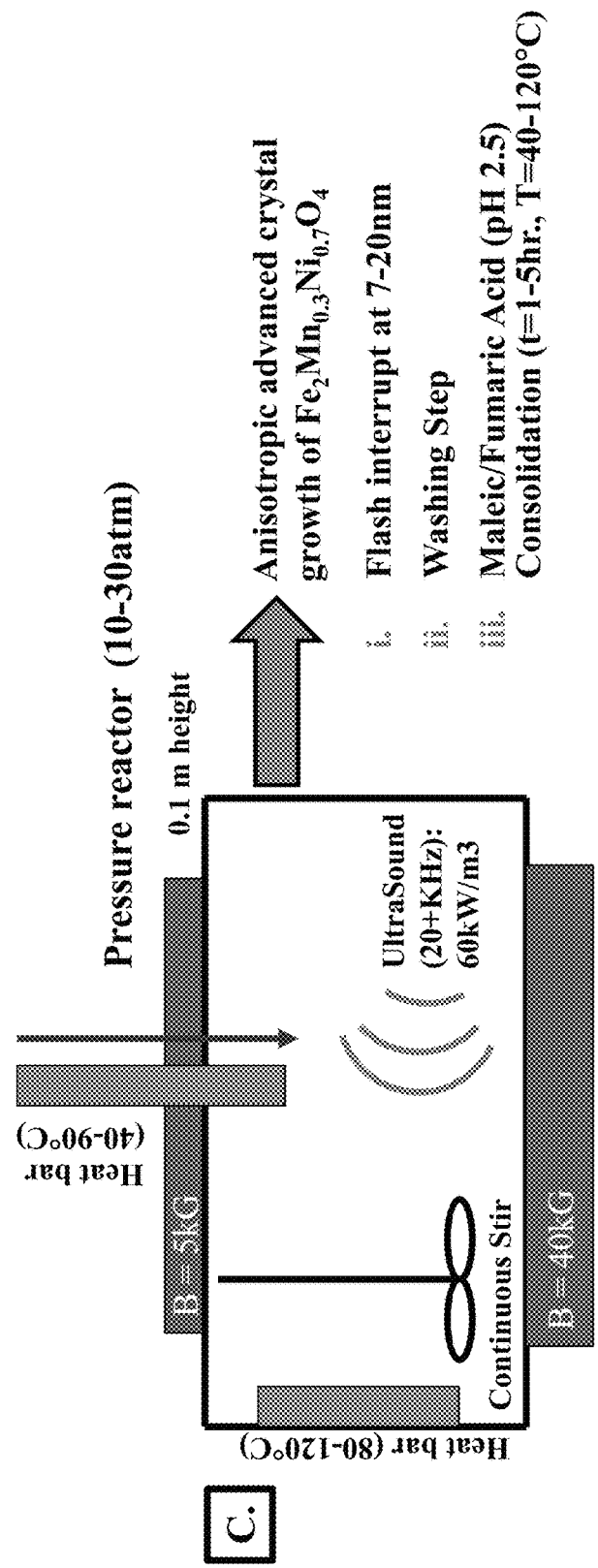
FIG. 2 is a schematic showing a process of combining two individual metal (i. Me(III), ii. Me(II)) hydroxide nanocrystalline precipitates (1-3 nm) to form larger precipitates of a third hydroxide solution of mixed metals (7-20 nm). A.) Individual metals are precipitated and growth and nucleation is flash interrupted by a cryogenic fluid (liquid nitrogen (LN)). B.) Precipitated solutions are simultaneously ejected down a heated rod into a pressure reactor chamber under distinct conditions. C.) Anisotropic advanced crystal growth of mixed metal precipitates occurs. The mixed metal precipitates are flash interrupted by LN, washed, and then exposed to an acid solution for acid assisted consolidation.

Materials and Methods. First, nano-crystallites of metals are prepared with a wet reduction method. A suspension of Me(III) and Me(II) salt solutions (i.e. Me(chlorides, sulfates, nitrates, etc.)) are each independently precipitated in an inert atmosphere using a base such as NaOH, increasing the pH of the system between 10-14, for 1-5 hours at elevated temperatures of 40-120 degrees C. to allow nucleation of very small nanocrystals that are 1-3 nm in diameter. Nucleation of nanocrystals is followed by flash interruption of growth by a cryogenic liquid, such as liquid nitrogen (LN), to form Me oxide particles of 1 nm to about 3 nm (FIG. 2, panel (a)). A third suspension of both Me(III) and Me(II) can also be precipitated under the same conditions.

The solutions are combined by ejecting them simultaneously toward a rod heated to 40-90 degree C. and precipitation continues as the fluids are collected in an autoclave with a pressure <100 MPa and temperature between 80-120 degree C. (FIG. 2, panel (b)). Ultrasonic frequencies of >20 KHz and a magnetic field magnetic field (H-field (Gauss)) created by placing two permanent magnets of 5 kG at the top and 40 kG at the bottom of the reaction chamber assist in anisotropic advanced growth of the particles (FIG. 2, panel (c)). The particles then undergo washing and acidic assisted consolidation in aqueous C5-10 and non-aqueous C16-24, about 1-100 mg/ml or (0-1M) concentration in appropriate medium, for 1-5 hrs at 40-120 degrees C. Acid consolidation is repeated multiple times in aqueous C5-10 and non aqueous C16-24. In preferred cases, during this step at least two carboxyl groups are dissociated and form a carboxylate complex with the Me atoms on the surface. The additive molecules, such as maleic acid or fumaric acid have a chemical moiety which is able to bind to the nanoparticle surface, control the particle growth and eventually yield to a preferred size. The growth is flash interrupted when the particles reach about 10-180 nm.

Figure 3:
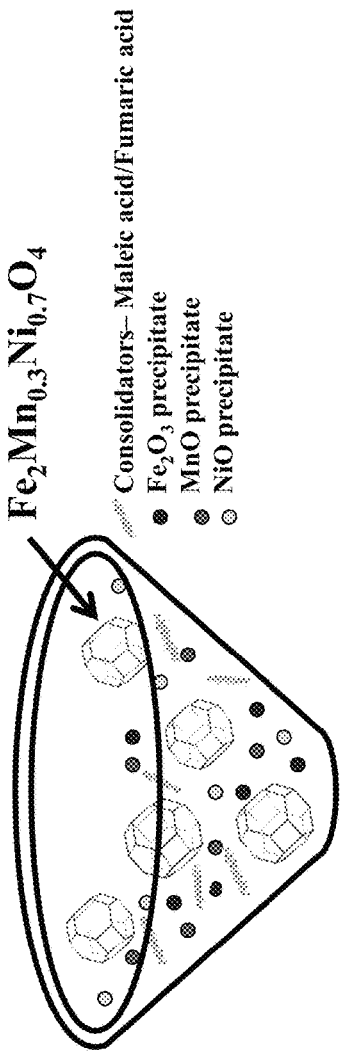
FIG. 3 is a schematic showing a final process of mixing all three predicated metal oxides (individual and mixed metals) with additional reactant products to form a densely packed nanosintered magnetic nanoparticle 10-180 nm. A.) The mixed metal acid consolidated precipitate solution (from FIG. 2) is washed and centrifuged and then added to a reaction pot with various reaction reagents, including more consolidation agents and individual metal precipitates. B.) The reaction solution is ejected down a heated rod into a pressure reactor chamber under distinct conditions. C.) Intimate particle proximity, under crystal growth conditions causes nanoparticle formation. The particles are flash interrupted by LN, washed, and then coated with surface stabilizers or other surface active agents and are now ready for combination with other ink components for a final ink formulation.
Figure 3:
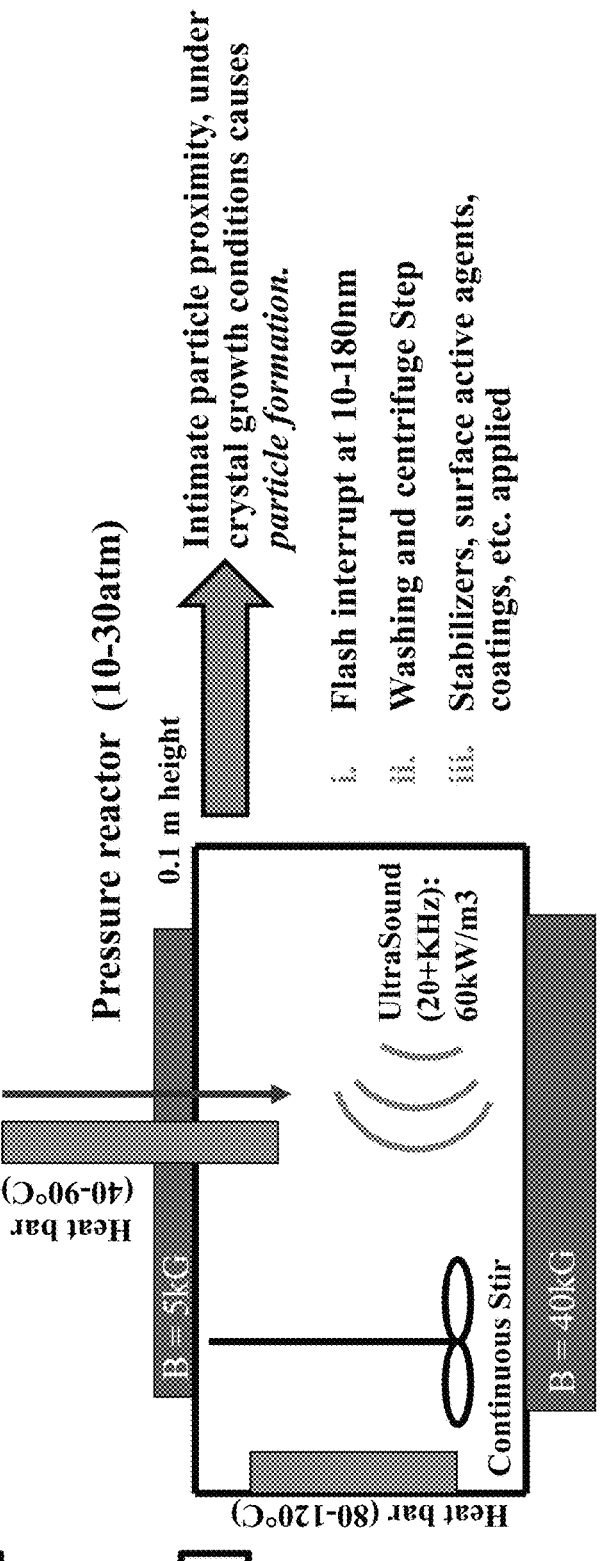
Figure 4:
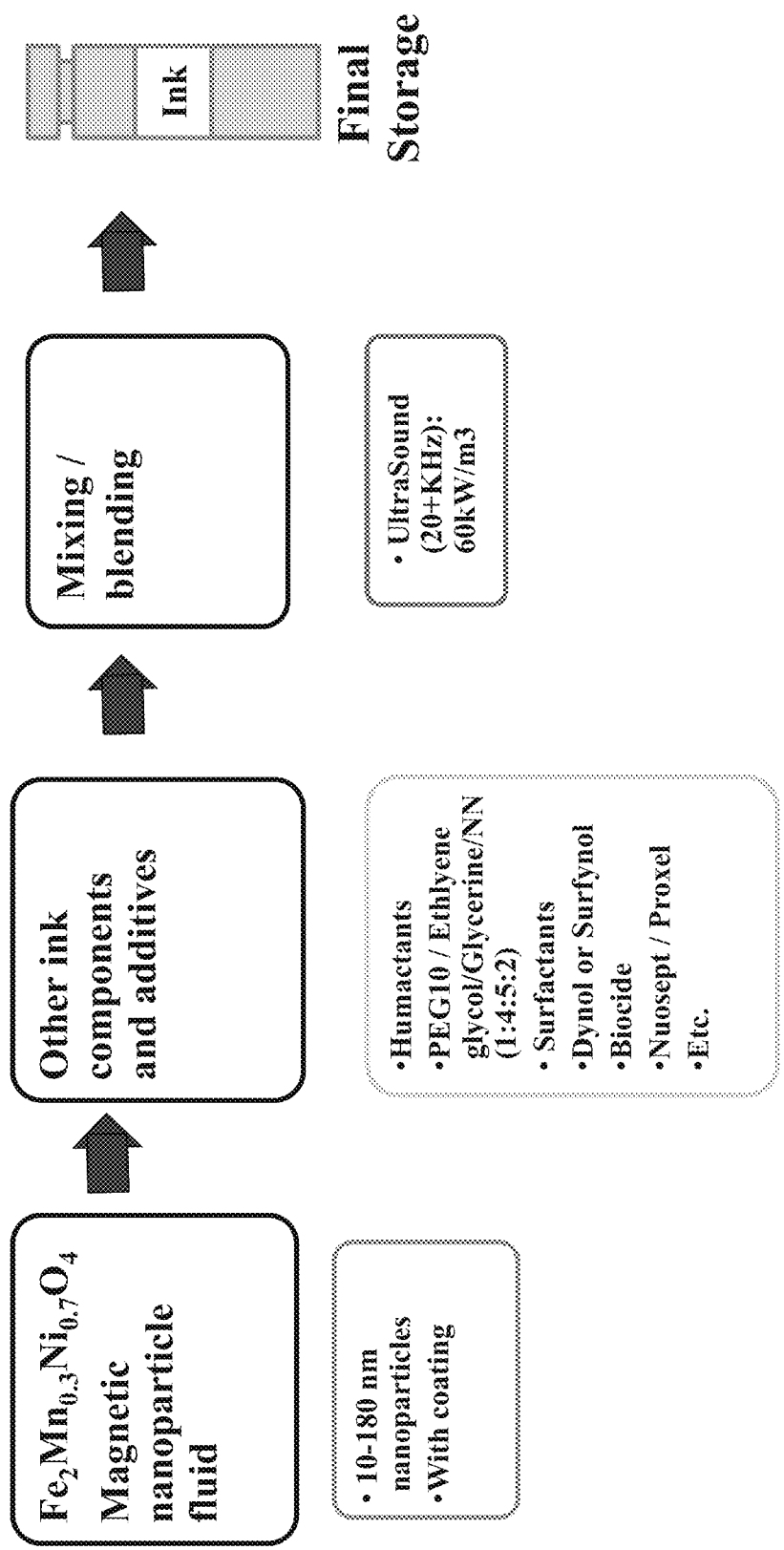
FIG. 4 provides a schematic depicting an exemplary final ink formulation. The fabricated nanoparticle fluid is combined with other components and additives to make a final ink formula ready for storage.

The consolidated metal nanoparticle precipitate solution is washed and further precipitation is allowed to occur with newly added reactants, which consists of metal precipitate solutions and acid consolidation solutions, by ejecting a mixture of various precipitates down a heated rod in the same way as described previously, as shown in FIG. 3 panels (a-b). Next, particles are fused by nanosintering in an autoclave (FIG. 3 panel (c)) under the same conditions as described previously in water, as an example of an aqueous solvent or particles can be nanosintered in epoxy/oil as a non-aqueous solvent, etc.—Intimate particle proximity, with aid of acid consolidation, under crystal growth conditions causes nanoparticle formation. The process is flash interrupted by liquid nitrogen when the nanoparticles reach a diameter of 10-180 nm, The nanoparticles are washed and centrifuged and a final surface stabilizer or coating is applied to the nanoparticle surfaces. Finally, the magnetic nanoparticle fluid is combined with other ink components and additives and prepared for final storage as shown in FIG. 4. The natural pigmentation is a result of the cross-crystallization and colors of the final Me nanoparticle composite.

What is claimed is:
1. A magnetizable nanoparticle sized between 10-180 nm and comprising:
    a) $M(III)_2O_3$, $M(II)O$ and $M(II)M(III)_2O_4$, wherein M(III) is a trivalent metal and M(II) is a divalent metal, or b) $Fe_2O_3$, MnO and M(II)O, wherein M is a divalent metal selected from the group consisting of Fe, Ni, Co, Cu, Pt, Au, Ag, Ba and a rare earth metal.

2. The nanoparticle according to claim 1, wherein the nanoparticle comprises the $M(III)_2O_3$, M(II)O and $M(II)M(III)_2O_4$, wherein M(III) is a trivalent metal and M(II) is a divalent metal.

3. The nanoparticle according to claim 1, wherein the nanoparticle comprises the $Fe_2O_3$, MnO and M(II)O, wherein M is a divalent metal selected from the group consisting of Fe, Ni, Co, Cu, Pt, Au, Ag, Ba and a rare earth metal.

4. The nanoparticle according to claim 1, wherein the distance between any two different neighboring metal oxides within the nanoparticle is 1 nm to 15 nm.

5. The nanoparticle according to claim 1, further comprising a surface moiety comprising a nucleic acid molecule.

6. The nanoparticle according to claim 1, further comprising a surface moiety comprising a polypeptide or a protein.

7. The nanoparticle according to claim 1, further comprising a surface moiety with a detectable label.

8. The nanoparticle according to claim 1, wherein the nanoparticle is magnetizable.

9. A substrate printed with a fluid comprising the nanoparticle according to claim 1.

10. The substrate according to claim 9, wherein the substrate is a layered document and the nanoparticle provides a security feature, wherein the nanoparticle is deposited between at least two of layers of the document, wherein the at least two layers are opaque.

11. The substrate according to claim 10, wherein the document is selected from the group consisting of a certificate, currency, a check, a ticket and a stamp.

12. The substrate according to claim 9, wherein the nanoparticle is covered with an opaque covering including a member selected from the group consisting of an ink, a dye, a pigment, a colored fluid, and an overcoat varnish.

13. The substrate according to claim 9, wherein the fluid is printed as a readable mark and in a configuration selected from the group consisting of an encoded 2-dimensional dot pattern, a 1-dimensional barcode, a 2-dimensional barcode, a QR barcode, a PDF417 barcode, a datamatrix barcode, a E13B format, a CMC7 format, and a magnetic ink character recognition (MICR) line.

* * * * *